(12) United States Patent
Engelhardt et al.

(10) Patent No.: US 7,842,741 B2
(45) Date of Patent: Nov. 30, 2010

(54) STABILIZED AQUEOUS POLYMER COMPOSITIONS

(75) Inventors: Friedrich Engelhardt, Frankfurt (DE); Christian Bremer, Bad Soden Salmünster (DE); Anja Obermüller, Bruchköbel (DE); Joachim Christian, Rödermark (DE)

(73) Assignee: Allessa Chemie GmbH (DE)

( * ) Notice: Subject to any disclaimer, the term of this patent is extended or adjusted under 35 U.S.C. 154(b) by 0 days.

(21) Appl. No.: 12/321,552

(22) Filed: Jan. 22, 2009

(65) Prior Publication Data
US 2009/0192055 A1   Jul. 30, 2009

(30) Foreign Application Priority Data
Jan. 28, 2008   (EP) ................... 08001496

(51) Int. Cl.
*C08K 5/00* (2006.01)
(52) U.S. Cl. ......................... 524/83; 524/801
(58) Field of Classification Search .................. 524/83, 524/801
See application file for complete search history.

(56) References Cited

U.S. PATENT DOCUMENTS

| 3,716,602 | A |  | 2/1973 | Iwami et al. ................. 260/889 |
| 4,309,523 | A |  | 1/1982 | Engelhardt et al. ........... 526/240 |
| 4,357,245 | A |  | 11/1982 | Engelhardt et al. ....... 252/8.5 C |
| 4,451,631 | A |  | 5/1984 | Engelhardt et al. ........... 526/287 |
| 4,499,232 | A |  | 2/1985 | Engelhardt et al. ........... 524/548 |
| 4,500,437 | A |  | 2/1985 | Engelhardt et al. ....... 252/8.55 C |
| 4,507,440 | A |  | 3/1985 | Engelhardt et al. ........... 525/218 |
| 4,521,317 | A |  | 6/1985 | Candau ................. 252/8.55 D |
| 4,551,513 | A |  | 11/1985 | Engelhardt et al. ........ 526/307.1 |
| 4,686,052 | A |  | 8/1987 | Baranet et al. ............. 252/8.551 |
| 4,721,577 | A |  | 1/1988 | Kanda et al. ............. 252/8.551 |
| 4,801,389 | A |  | 1/1989 | Brannon et al. ........... 252/8.551 |
| 5,103,913 | A |  | 4/1992 | Nimerick et al. ............ 166/308 |
| 5,503,759 | A | * | 4/1996 | Evans et al. ................. 508/221 |
| 5,735,349 | A |  | 4/1998 | Dawson et al. .............. 166/295 |
| 6,794,473 | B2 |  | 9/2004 | Yamaguchi et al. ......... 526/270 |
| 2006/0027364 | A1 |  | 2/2006 | Kelly et al. ................. 166/278 |

FOREIGN PATENT DOCUMENTS

| CA | 2467791 |  | 11/2004 |
| DE | 1 089 173 |  | 9/1960 |
| DE | 24 32 699 |  | 1/1976 |
| DE | 3312711 | A1 | 10/1983 |
| DE | 3520507 | A1 | 12/1985 |
| EP | 0 208 373 | A2 | 1/1987 |
| GB | 1203674 |  | 9/1970 |
| GB | 2106958 | A | 4/1983 |

* cited by examiner

*Primary Examiner*—Kriellion A Sanders
(74) *Attorney, Agent, or Firm*—Michael W. Ferrell; Robert S. Alexander

(57) ABSTRACT

The aqueous polymer composition comprises a water soluble polymer having a molar weight of at least $10^4$ Daltons and comprising functional groups which may form complexes with metal ions. The aqueous polymer compositions of this invention are stabilized against thermal or other degradation processes by addition of a phenothiazine compound to allow their use even under harsh conditions.

37 Claims, No Drawings

STABILIZED AQUEOUS POLYMER COMPOSITIONS

CLAIM FOR PRIORITY

This application is based upon European Patent Application No. EP 080014961.2, entitled, "Stabilized Aqueous Polymer Compositions", filed Jan. 28, 2008. The priority of European Patent Application No. EP 080014961.2 is hereby claimed and its disclosure incorporated herein by reference in its entirety.

TECHNICAL FIELD

This invention is directed to aqueous polymer compositions which are stable at high temperatures against thermal, chemical and mechanical degradation.

BACKGROUND

There are several attempts known of aqueous polymer compositions stabilized against degradation.

United States Patent Application Publication No. US 2006/0027364 discloses an aqueous, viscoelastic treating fluid gelled with a crosslinked guar or guar derivative. The viscosity of this treating fluid and the thermal stabilization is improved by addition of a glycol.

U.S. Pat. No. 5,103,913 discloses aqueous fracturing fluids with improved temperature stability. These fluids contain guar gelling agent and a soluble bicarbonate. As shown in the patent examples these fluids are applicable for operations in the temperature range between 175° C. and 210° C.

U.S. Pat. No. 4,801,389 discloses aqueous fracturing fluids with improved temperature stability. These fluids contain guar gelling agent, zirconium or hafnium crosslinking agent and a bicarbonate salt. These fluids are applicable for operations in the temperature range between 80 and 120° C.

U.S. Pat. No. 4,721,577 discloses stabilized fracturing fluids with improved temperature stability. These fluids contain guar gelling agent and thiol derivatives of selected heterocyclic compounds. These fluids are applicable for operations in the temperature range between 90 and 200° C.

U.S. Pat. No. 4,686,052 discloses gels derived from solvatable polysaccharides and crosslinked with titanium or zirconium compounds. These gels are stabilized against shear degradation at elevated temperature by addition of an alkanolamine.

Canadian Patent No. 2,467,791 discloses dry blended particulate compositions for well treating comprising a particulate hydratable polysaccharide, a particulate crosslinking agent, a particulate base and a particulate sodium, potassium or ammonium pyrophosphate or oxalate. As a thermal stabilizer sodium thiosulfate is proposed.

In the last years, commercially successful exploration of subterranean deposits has become more difficult because the subterranean deposits are prospected in a deeper stratum. For this reason, the temperature of the stratum tends to rise and, in many cases, it reaches 150° C. or more. At such high temperatures, the applied polymers deteriorate, for example by thermal, chemical or physical stress degradation. This leads to a reduction in rheological properties of the aqueous polymer composition and creates a serious obstacle in high temperature applications. Accordingly, the inherent functions of the aqueous polymer composition fluid can be satisfactorily obtained only if degradation (e.g., caused by decomposition) of its rheological and chemical properties can be prevented even at elevated temperatures.

U.S. Pat. No. 6,794,473 discloses an acrylic acid polymer and a production process therefore. For stabilizing the acrylic monomer against premature polymerization small amounts of phenothiazine are used.

GB-A-2,106,958 and EP-A-208,373 disclose crosslinked polymers for fracturing subterranean formations. But these documents do not disclose how to stabilize a polymer composition against thermal stabilization. In EP-A-208,373, a selected alkanolamine is used in combination with selected crosslinkers to maintain the resistance to shear degradation of the crosslinked fluid even under conditions of use at elevated temperatures.

It would be desirable if a composition and method could be devised to stabilize and enhance the performance of aqueous polymer compositions. The present invention is intended to overcome the above problems and an object of the present invention is to provide stabilized aqueous polymer compositions. It has been found that the above described object can be attained by adding phenothiazine compounds to the aqueous polymer compositions or to precursors of it.

SUMMARY OF INVENTION

Surprisingly, it was found that the addition of small amounts of phenothiazine or/and certain derivatives of it is very effective to stabilize aqueous polymer compositions against degradation to maintain their chemical and rheological properties even under harsh conditions.

The present invention is directed to a stabilized aqueous polymer composition containing:
A) a stabilizing amount of at least 10 ppm of at least one phenothiazine compound, and
B) at least one polymer with a molecular weight of at least $10^4$ Daltons, preferably at least $10^5$ Daltons, comprising groups which are capable of complex formation with ions.

In an alternative embodiment of the invention, polymers and said phenothiazine compound are present in a water-in-oil emulsion. In these emulsions the major part or even the total amount of the polymer is present in the water-containing portion of the emulsion. The oil-part of the emulsion is formed from a fluid which is liquid at 25° C. and which does not dissolve in water but forms an emulsion, preferably in combination with conventional emulsifiers. Examples of said fluid are liquid hydrocarbons, higher alcohols, and higher ketones, higher alkyl esters which are not or are only sparingly soluble in water. These water-in-oil emulsions can be used to prepare the aqueous polymer solutions referred to above.

In still an alternative embodiment of the invention, said polymer and said phenothiazine compound are suspended or dispersed in a non-aqueous fluid. In these dispersions the major part or even the total amount of the polymer and the phenothiazine compound are present in solid particulate form and are dispersed or suspended in said fluid, preferably in an organic medium being liquid at 25° C. that is soluble or non-soluble in water. Examples of said liquid organic medium are hydrocarbons, alcohols, phenols, ketones, preferably lower alkyl alcohols and/or polyalkylene glycols, such as polyethylene glycol or propylene glycol. These dispersions can be used to prepare the aqueous polymer solutions referred to above.

In still an additional embodiment of the invention a solid formulation of said polymer in particulate solid form, such as in powder or granular form, containing at least one phenothiazine compound is provided. These solid formulations can be used to prepare the aqueous polymer solutions or the water-in-oil emulsions referred to above.

DETAILED DESCRIPTION

The invention is described in detail below with reference to numerous examples which are presented for purposes of illustration only. The spirit and scope of the invention is set forth in the appended claims.

The polymer used in aqueous polymer compositions of the present invention contains groups which are capable of complex formation with ions, preferably multivalent metal ions, and said polymer has a molecular weight of at least 10.000 Dalton, preferably at least $10^5$ Dalton, and especially preferred $4*10^5$-$1*10^7$ Dalton.

Typical polymers include, but are not necessarily limited to solvatable cellulose derivatives and to synthetic polymers with functional groups that can be crosslinked via ionic components.

The hydratable polymer that is useful in the present invention can be, but is not necessarily limited to, any of the hydratable polysaccharides having galactose or mannose monosaccharide components. These polysacharides are capable of gelling in the presence of a crosslinking agent to form a gelled fluid, and while crosslinking is not absolutely necessary, it is expected that in many cases the polymer will be crosslinked. For instance, suitable hydratable polysaccharides include galactomannan gums, glucomannan gums and celluolse derivatives. Examples of such polymers include guar gums, guar gum derivatives, galactomannan gums, glucomannan gums, and xanthan gums.

Guar derivatives are defined herein as guar gum reacted with a compound having a different functional group than guar. In one non-limiting embodiment, other derivatives can be hydroxyalkyl guar, carboxyalkyl guar, and carboxyalkyl hydroxyalkyl guar or hydrophobically modified guar.

There are numerous examples available of synthetic polymers with functional groups that can be crosslinked via ionic components.

The use of synthetic polymers in aqueous solution of the present invention is preferred.

Preferably, water-soluble copolymers with functional groups that can be crosslinked via ionic components are used. Examples of such copolymers are disclosed in the U.S. Pat. Nos. 4,309,523; 4,357,245; 4,451,631; 4,499,232; 4,500,437; 4,507,440; 4,551,513 and 5,735,349.

These copolymers are produced via various polymerization processes, e.g. by polymerizing aqueous monomer solutions by precipitation polymerization or by inverse emulsion polymerization. The latter being the preferred process. The polymerization reaction can be initiated by redox systems, azo initiators or radiation. At the location of use these products or their precursors are dissolved to form aqueous solutions, emulsions, gels or foams. The polymer content of an aqueous solution in applicable form is typically in the range of 0.01 to 10% by weight, preferably about 0.05 to 5% by weight. Emulsions, preferably water-in-oil (W/O) emulsions as concentrated precursors can carry much higher contents of the polymer. The water-in-oil emulsions can be transformed into aqueous solutions by adding said emulsions to a stirred waterphase, such as disclosed in U.S. Pat. No. 4,299,755.

DE-A-35 20 507, DE-AS-1,089,173, DE-A-33 12 711 and DE-A-24 32 699 disclose inverted microlatices of water-soluble copolymers obtainable by copolymerisation of water-soluble monomers which are emulsified by means of emulsifiers in an organic phase. U.S. Pat. No. 4,521,317 discloses transparent and stable microlatices dispersed in water which can be used in oil production.

Preferred synthetic polymers for use in the stabilized aqueous solutions, emulsions or particulate solid mixtures of this invention are copolymers derived from:
   i) at least one amide of an ethylenically unsaturated carboxylic acid, from
   ii) at least one ethylenically unsaturated phosphonic acid, from
   iii) at least one ethylenically unsaturated sulfonic acid, and optionally from
   iv) at least one ethylenically unsaturated carboxylic acid and optionally from
   v) at least one additional copolymerizable monomer.

The proportion of monomers i), referring to the total amount of monomers, is in general between 20 and 90% by weight, preferably between 30 and 80% by weight.

The proportion of monomers ii), referring to the total amount of monomers, is in general between 0.1 and 20% by weight, preferably between 0.2 and 10% by weight.

The proportion of monomers iii), referring to the total amount of monomers is in general between 9 and 80% by weight, preferably between 25 and 60% by weight.

The proportion of monomers iv), referring to the total amount of monomers is in general between 0 and 20% by weight, preferably between 0 and 10% by weight.

The proportion of monomers v), referring to the total amount of monomers is in general between 0 and 20% by weight, preferably between 0 and 10% by weight.

The preferred synthetic copolymers for use in the fluids of this invention typically have molecular weights characterized by K-values between 50 and 750, preferably between 150 and 350.

Preferably synthetic copolymers are used which are derived from 30 to 80% by weight of monomers i), from 0.1 to 10% by weight of monomers ii), from 25 to 60% by weight of monomers iii) and from 0 to 10% by weight of monomers iv).

Very preferably used are copolymers derived from the following combination of monomers:
   at least one amide of an ethylenically unsaturated carboxylic acid, at least one ethylenically unsaturated phosphonic acid and at least one ethylenically unsaturated sulfonic acid;
   at least one amide of an ethylenically unsaturated carboxylic acid, at least one ethylenically unsaturated phosphonic acid, at least one ethylenically unsaturated sulfonic acid and at least one ethylenically unsaturated carboxylic acid;
   at least one amide of an ethylenically unsaturated carboxylic acid, at least one ethylenically unsaturated phosphonic acid, at least one ethylenically unsaturated sulfonic acid, and at least one N-vinylamide; and
   at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one N-vinylamide.

Further, the copolymers besides the sulfonic, phosphonic or carboxylic acid groups do contain additional crosslinkable groups, such as amidocarbonyl groups, or can contain further groups, which can be crosslinked by the action of bifunctional compounds reacting with said groups. These reactions can form swellable polymer networks or crosslinked polymers with higher viscosity. Examples thereof are found in U.S. Pat. No. 4,499,232.

Examples of amides of ethylenically unsaturated carboxylic acids i) are amides of ethylenically unsaturated carboxylic acids with one or two carboxylic acid groups, at least one carboxylic acid group carrying an amide group. Preferred monomers of this type are the amide of acrylic acid, the amide of methacrylic acid, the mono- or bis-amide of fumaric acid, the mono- or bis-amide of maleic acid or the mono- or bis-amide of itaconic acid. Preferred are the amides of acrylic acid or of methacrylic acid.

These amides can be also used in the form of their N-functionalised derivates, such as N-alkyl derivatives or N-methylol derivatives. Examples of said monomers are N-methylolacrylamide, N-methylolmethacrylamide, N-methylacrylamide, N-methylmethacrylamide, N-tert.-butylacrylamide or N-tert.-butylmethacrylamide.

Examples for ethylenically unsaturated phosphonic acids ii) are vinyl phosphonic acid or its alkaline- or ammonium salts, its mono- or diesters or its anhydride, 2-(acryloylamino)-2-methylpropylphosphonic acid or its alkaline- or ammoniums salts, its mono- or diesters or its anhydride.

Examples for ethylenically unsaturated sulfonic acids iii) are vinyl sulfonic acid, 2-acrylamido-2-methylpropane-sulfonic acid ("AMPS"), 2-methacrylamido-2-methylpropane-sulfonic acid or their alkali metal salts or ammonium salts.

Examples for ethylenically unsaturated carboxylic acids iv) are ethylenically unsaturated compounds with one or two carboxylic acid groups or their anhydrides and/or their salts. Preferred monomers of this type are acrylic acid, methacrylic acid, fumaric acid, maleic acid or itaconic acid. Preferred are acrylic acid or methacrylic acid as well as the corresponding alkali metal salts or ammonium salts.

Examples for further copolymerisable monomers v) are compounds which do not adversely affect the solubility of the copolymer in water and which optionally award a further desired property to the copolymer. Examples for monomers of this type are esters of ethylenically unsaturated carboxylic acids, such as alkylesters of acrylic acid or of methacrylic acid, or vinylesters of saturated carboxylic acids, such as vinylacetate.

Further examples for monomers v) are crosslinkers, which are monomers with more than one ethylenically unsaturated group. Different compound classes can be used, such as bisamides, e.g. methylene-bis-acrylamide; bis-, tris- or tetraether derived from two- three- or fourvalent alcohols and from ethylenically unsaturated halides, e.g., trimethylolpropane diallylether, pentaerithritol-triallylether and tetraallyloxy-ethane; or esters of ethylenically unsaturated carboxylic acids with multivalent alcohols, e.g. di-, tri- or tetraacrylates or -methacrylates derived from ethyleneglycol, from trimethylolpropane or from pentaerythrite; or di-, tri- or polyamines which are substituted at the nitrogen atom with ethylenically unsaturated residues, such as N,N'-diallyl-ethylenediamine or triallylamine.

Crosslinker monomers, if present, typically are used in amounts between 0.01 and 2% by weight, preferably between 0.1 and 1.5% by weight, referring to the total amount of monomers used.

Further examples for monomers v) are N-vinylamides of a saturated carboxylic acid. These monomers are, for example, derived from an amide of a saturated aliphatic carboxylic acid, such as formic acid or acetic acid, carrying a N-vinyl group. Preferably these monomers carry at the amide-nitrogen a further functional group, such as a methylol group or a N-alkyl group. Preferred N-vinylamides of a saturated carboxylic acids are N-vinyl acetamide, N-vinyl formamide, N-vinyl-N-methyl formamide, N-vinyl-N-methyl acetamide, N-methylol-N-vinyl formamide and N-methylol-N-vinyl acetamide. These monomers are incorporated via the N-vinyl groups into the copolymer and can be transformed by hydrolysis of the amide group into recurring structural units of formulae —CH$_2$—CH(NH$_2$)— or —CH$_2$—CH(NHR)— or —CH$_2$—CH(NRR')—, wherein R and R' are monovalent organic groups.

Additional examples for monomers v) are N-vinylamides of nitrogen-containing heterocylic compounds, preferably N-vinyl heterocyclic compounds with one or more ring nitrogen atoms, for example N-vinyl pyridine or N-vinyl imidazole. Furthermore, besides straight-chain and short-chain N-vinylamides referred to above also N-vinylamides of lactams can be used, such as N-vinylpyrrolidone or N-vinyl caprolactam.

Copolymers preferably used in the stabilized aqueous polymer solutions or emulsions of this invention are derived from the following monomer combinations:

acrylamide and/or methacrylamide, and vinylphosphonic acid, and AMPS and/or vinylsulfonic acid;

acrylamide and/or methacrylamide, and vinylphosphonic acid, and AMPS and/or vinylsulfonic acid, and acrylic acid and/or methacrylic acid;

acrylamide and/or methacrylamide, and vinylphosphonic acid, and AMPS and/or vinylsulfonic acid, and N-vinylformamide and/or N-vinylpyrrolidone; and acrylamide and/or methacrylamide, and vinylphosphonic acid, and AMPS and/or vinylsulfonic acid, and acrylic acid and/or methacrylic acid, and N-vinylformamide and/or N-vinylpyrrolidone.

Copolymers derived from acrylamide, vinylphosphonic acid, AMPS and optionally acrylic acid and/or methacrylic acid are especially preferred.

The stabilized aqueous polymer composition of this invention can be in the form of aqueous solutions of the polymer with a molecular weight of at least $10^4$ Daltons comprising groups which are capable of complex formation with ions; or they can be in the form of hydrogels derived from said aqueous solutions by using an ionic crosslinking agent; or they can also be in the form of a foam obtained by foaming the hydrogels with a foaming agent.

As another indispensable feature of the aqueous polymer composition of this invention, a phenothiazine stabiliser or a mixture of phenothiazine stabilizers is used.

As a phenothiazine compound, unsubstituted phenothiazine and unsubstituted phenothiazine 5-oxide or a hydrohalogenide, preferable a hydrochloride of these compounds can be used. The 5-position in the phenothiazine ringsystem is the position of the ring-nitrogen atom.

Besides the unsubstituted phenothiazine compounds, their 5-oxides or hydro-halogenides substituted derivatives of these compounds may be used. The substitution can be at any position of the ring where substitution is possible and one or more substituents can be present. Typical substituents are alkyl groups, alkoxy groups, aryl groups, aroyl groups, carboxyl groups, carboxylic acid ester groups, carboxylic acid amide groups, halogen atoms, hydroxyl groups, nitro groups or a combination of two or more of these groups.

Preferred phenothiazine compound are selected from the group consisting of phenothiazine, alkyl-substituted phenothiazine, aryl-substituted phenothiazine, aroyl-substituted phenothiazine, carboxyl-substituted phenothiazine, halogen-substituted phenothiazine, N-(dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, N-(dialkylaminoalkyl)-substituted phenothiazine-5-oxide and the hydrochlorides of these compounds.

Very preferred phenothiazine compounds are selected from the group consisting of phenothiazine, 3-phenylphenothiazine, N-phenylphenothiazine, phenothiazine-5-oxide, 10,10'-diphenyl-phenothiazine, N-benzoylphenothiazine, 7-benzoyl-phenothiazine, 3,7-difluorophenothiazine, N-ethylphenothiazine, 2-acetyl-phenothiazine, 3,7-dioctylphenothiazine, N-methylphenothiazine-5-oxide, N-acetylphenothiazine, N-(2-diethylaminoethyl)-phenothiazine, N-(2-dimethylaminopropyl)-phenothiazine, N-(2-dimethylaminopropylphenothiazine)-hydrochloride, N-octadecylphenothiazine and N-propylphenothiazine.

The amount of phenothiazine compound in the aqueous polymer composition of this invention of at least 10 ppm is chosen to obtain a stabilizing effect of said aqueous polymer composition. In general, minor amounts of the phenothiazine compound are used, for example amounts of less than 20% by weight, referring to the total composition.

Preferably 10 ppm to 10% by weight in the final polymer are used, very preferred 80 ppm to 5% by weight.

As most of the phenothiazine compounds are water insoluble, said phenothiazine compounds are either dispersed in the aqueous solution or in the hydrogel formed therefrom; or solvents for the phenothiazine compound, such as alcohols, are added to the aqueous solution of the polymer. Another possibility reflects the addition of the phenothiazine compound to a precursor emulsion, preferably a W/O precursor emulsion, which releases the polymer after mixing with water to form a stabilized aqueous solution of a polymer As is well known, most polymers used in the aqueous polymer composition of this invention are typically crosslinkable in an aqueous medium by a wide variety of complexing ions. These ionically crosslinkable polymers have a remarkable capacity to thicken aqueous liquids and thus to form gels. Any suitable crosslinking agent can be used that is effective at crosslinking the aqueous polymer solution. Preferably the ionic crosslinking agent is selected from borates, or from ions from multivalent metals, such as zirconates and titanates. The crosslinking agent is optionally encapsulated, Suitable crosslinking agents are known to those skilled in the art.

Very preferred the aqueous solutions of the polymer are crosslinked by adding zirconates and/or titanates.

Additional high temperature stabilizers, besides the phenothiazine compound or the phenothiazine compounds may also be present.

In another embodiment of the invention, the aqueous polymer composition may contain additives including, but not necessarily limited to, viscosifiying agents, water wetting surfactants, clay stabilization additives, scale dissolvers, biopolymer degradation additives, pH buffers, biocides, surfactants, non-emulsifiers, anti-foamers, inorganic scale inhibitors, colorants, clay control agents, time delayed degrading agents and other common components.

The invention is also embodied by adding at least 10 ppm of at least one phenothiazine compound to an emulsion, preferably a W/O emulsion in which the water phase comprises polymer containing groups which are capable of complex formation with ions, and having a molecular weight of at least 10.000 Dalton. The organic phase of said W/O emulsion comprises organic solvents which are not or only partially miscible with the water phase.

The invention also relates to a method of stabilizing an aqueous solution or a water-in-oil emulsion, said solution or emulsions containing a polymer containing groups which are capable of complex formation with ions, said polymer having a molecular weight of at least 10.000 Dalton which method comprises adding a stabilizing amount of at least 10 ppm of at least one phenothiazine compound to said aqueous solution or to said water-in-oil emulsion to result in a stabilisation against thermal degradation of said polymer.

In still another embodiment the invention relates to the use of a phenothiazine compound to stabilize a polymer with a molecular weight of at least 10.000 Daltons comprising groups which are capable of complex formation with ions, or to stabilize a gelled polymer obtained from said polymer by the action of ions, against thermal degradation.

Further embodiments of the invention comprise applications in industrial processes where the physical properties of applied polymers need to be maintained over an extended period of time despite heat, chemical or mechanical stress.

The following examples are for illustration purposes only and are not intended for limiting the scope of the invention.

The following working examples demonstrate the manufacture of the stabilized aqueous solutions of this invention. The abbreviations used in the examples and in the included tables have the following meanings:

AM = acrylamide
AMPS = 2-acrylamido-2-methylpropane sulfonic acid
AS = acrylic acid
NVP = N-vinyl-pyrrolidone
VIA = vinylacetamide
VIFA = vinylformamide
VIMA = N-vinyl-N-methylacetamide
VIMFA = vinyl-methyl-formamide
VPA = vinylphosphonic acid Example 1

Into a 2 l reaction vessel placed in a water bath and fitted with a mechanical stirrer, reflux condensor, dropping funnel and gas-inlet were placed 400 ml of deionized water and 18.7 ml of a 25% by weight aqueous solution of ammonia. While introducing a slow stream of nitrogen, 9.3 g of AMPS and 2 g of VPA were added and as soon as a clear solution was obtained 60 g of AM, 18.6 g of NVP, and 14.7 g of VIFA were admixed. The pH value of the solution was 6.5. The reaction mixture was heated to 50° C. and the polymerization was triggered by addition of 5 ml of a 20% by weight aqueous solution of ammonium peroxodisulfate. After an induction period of about 10 minutes the reaction started, the temperature raised to 65° C. and the reaction mixture became viscous. The batch was then heated to 80° C. and kept at this temperature for two hours. After recooling to room temperature, a highly viscous solution was obtained. To this aqueous polymer solution 3.5 g phenothiazine dissolved in 25 ml ethylene glycol mono methylether were added under stirring.

Example 2

Into a 2 l reaction vessel placed in a water bath and fitted with a mechanical stirrer, reflux condensor, dropping funnel and gas-inlet were placed 500 ml of tert. butanol and suspended therein 20 g of AMPS while stirring. Then 2.2 l of ammonia gas were introduced and 65 g of AM, 15 g of VIFA and 3 g of VPA were added. While introducing a stream of nitrogen the reaction mixture was heated up to 50° C. and 1.0 g of azoisobutyronitrile was added. After an induction period of some minutes the polymerisation started. The reaction temperature rose to 81° C. and the polymer precipitated. The reaction mixture was kept for another two hours at 80° C. during which time it became a viscous suspension. To the polymer slurry there was added 5.0 g of phenothiazine dissolved in 100 ml of tert-butanol. The polymer/pheno-thiazine composition was isolated by distilling off the solvent under reduced pressure and subsequent drying. The polymer/phenothiazine composition obtained represented a slightly pink powder easily soluble in water.

According to the procedure described in the preceeding example the copolymer/-phenothiazine compositions of the following tables 1 and 2 were prepared,

TABLE 1

| Example No. | Concentration of monomers (% by weight) | | | | | | |
|---|---|---|---|---|---|---|---|
| | AM | AS | AMPS | VPA | VIFA | VIMFA | VIMA | VIA |
| 3 | 65 | 2.0 | 18 | 2 | 13 | | | |
| 4 | 65 | | 31 | 4 | | | | |
| 5 | 65 | 10 | 10 | 3 | | | 12 | |
| 6 | 65 | | 20 | 4 | | | | 11 |
| 7 | 65 | | 20 | 3 | | 12 | | |
| 8 | 65 | | 20 | 5 | | 10 | | |
| 9 | 65 | | 20 | 3 | 2 | | | 10 |
| 10 | 65 | | 20 | 3 | | | | 12 |
| 11 | 60 | | 30 | 0.5 | 9.5 | | | |

TABLE 2

| Example No. | Concentration of monomers (% by weight) | | | | | | |
|---|---|---|---|---|---|---|---|
| | AM | AS | AMPS | VIFA | VIMFA | VIMA | VIA | VPA 1 |
| 12 | 65 | | 20 | 13 | | | | 2 |
| 13 | 65 | | 20 | 11 | | | | 4 |
| 14 | 65 | | 20 | | | 12 | | 3 |
| 15 | 65 | | 20 | 13 | | | | 2 |
| 16 | 65 | 10 | 10 | | 10 | | | 5 |
| 17 | 65 | | 20 | | 12 | | | 3 |
| 18 | 65 | 2.0 | 18 | | | | | 4 |
| 19 | 60 | | 20 | 15 | | | | 5 |
| 20 | 40 | | 40 | 15 | | | | 5 |
| 21 | 50 | | 30 | 15 | | | | 5 |
| 22 | 40 | 10 | 30 | 15 | | | | 5 |
| 23 | 40 | 5.0 | 35 | 15 | | | | 5 |
| 24 | 60 | | 20 | 15 | | | | 5 |

Example 25

Into a 500 ml reaction vessel placed in a water bath and fitted with a mechanical stirrer, reflux condensor, dropping funnel and gas-inlet were placed a solution of 0.23 g of sorbitan monolaurate, 1.09 g of sorbitan monostearate, 0.14 g of sorbitan mono-oleate, and 4.3 g of polyoxyethylene sorbitan monostearate in 56.4 g of Exxon's hydrocarbon Norpar 13, a paraffin straight-chain hydrocarbon. The solution was degassed with nitrogen and heated to 60° C. Then a solution containing 33.6 g of AM, 5.4 g of AMPS, 6.6 g of VMAA, 6.6 g of VIFA, 7.8 g NVP and 2 g of VPA were added to 78.8 g deionized water containing 2.6 ml of 10% sodium hydroxide solution. The pH value was 7.4. Then 23 mg of 2,2'-azobis-(2-amidinopropane)-hydrochloride were added to the aqueous solution. This solution was added to the hydrocarbon solution with moderate stirring forming a milky white emulsion. As the temperature approached 60° C., the stirring was reduced to approximately 60 revolutions per minute. After an induction period of 10 minutes, the temperature began to rise. At approximately 80° C., the emulsion became transparent and stirring was increased. The peak temperature was 97° C. After cooling to 80° C., the temperature was held for two hours yielding a stable emulsion containing 30% active polymer. After the polymerisation 2.0 g of phenothiazine powder were added to the solution under stirring.

Example 26

67 g of Exsol D, a deodorized kerosene boiling between 190 and 240° C., sold by Esso Chemie of Germany, were introduced into a 1-liter polymerisation flask and were heated to a temperature of 60° C. with weak stirring. 0.27 g of sorbitan monolaurate, 1.3 g of sorbitan monostearate, 0.17 g of sorbitan monooleate and 4.3 g of polyoxyethylene sorbitan monostearate were successively added and dissolved. With further weak stirring a stream of nitrogen was passed into the solution and the temperature was adjusted to 60° C. 94 ml water were given into a separate vessel and 6.4 g of AMPS, 44.8 g of AM, 1 g of VPA and 10.6 g of VIFA were added and dissolved while stirring. This solution was adjusted to a pH value of 8 to 10 by the dropwise addition of 10% strength aqueous solution of sodium hydroxide. Then 0.1 g of ammonium persulfate were added. This monomer solution was then emulsified by adding the organic phase via a dropping funnel into the reaction flask with rapid stirring. The polymerization reaction started after approximately 30 minutes, which was recognized by a temperature rise. In the course of 15 minutes the reaction temperature rised to 80-90° C. After the polymerization reaction had faded out, the solution was heated for another two hours at 80° C. A stable emulsion having a polymeric content of 30% by weight was obtained. The molecular weight of the polymer was 100.000. After the polymerisation 8.0 g of phenothiazine powder were added to the emulsion under stirring.

Example 27

1.85 g of sorbitan monostearate were dissolved in a technical isomeric hydrocarbon solvent Isopar M having a boiling range of from 200 to 240° C., sold by Exxon Corporation. This solution was introduced into a 2-liter reaction vessel fitted with a mechanical stirrer, thermometer and gas inlet for nitrogen. A solution of monomers was produced by dissolving 25.0 g of AM, 3.7 g of AMPS, 3 g of VPA and 9.2 g of VIFA in 40 ml of deionized water and the pH value of the mixture was adjusted to 8.0 by adding a 25% aqueous solution of ammonium hydroxide. Then the aqueous monomeric solution was slowly added to the organic sorbitan monostearate solution while vigoroursly stirring and the air in the reaction vessel was replaced by nitrogen. 0.07 g of 2,2'-azobis-iso-butyronitrile dissolved in acetone were added to the monomer emulsion and the reaction vessel gently heated to 60° C. while stirring. The polymerisation reaction was finished after 2.5 hours to result in a stable emulsion of the copolymer. After the polymerisation 5.0 g of phenothiazine powder were added to the emulsion under stirring.

Example 28

67 g of Isopar M were introduced into a 1-liter polymerisation flask and were heated to a temperature of 60° C. with weak stirring. 0.27 g of sorbitan monolaurate, 1.3 g of sorbitan monostearate, 0.17 g of sorbitan monooleate and 4.3 g of polyoxyethylene sorbitan monostearate were successively added and dissolved: With further weak stirring a stream of nitrogen was passed into the solution and the temperature was adjusted to 60° C. 94 ml water were given into a separate vessel and 12.8 g of AMPS, 49.8 g of AM, 4 g of VPA and 6.4 g of VIFA were added and dissolved while stirring. This solution was adjusted to a pH value of 8 to 10 by the dropwise addition of 25% strength aqueous solution of ammonium hydroxide. Then 0.1 g of ammonium persulfate were added. This monomer solution was then emulsified by adding the organic phase via a dropping funnel into the reaction flask with rapid stirring. The polymerization reaction started after approximately 30 minutes, which was recognized by a temperature rise. In the course of 15 minutes the reaction temperature rised to 80-90° C. After the polymerization reaction had faded out, the solution was heated for another two hours at 80° C. A stable emulsion having a polymeric content of 30% by weight was obtained. The molecular weight of the polymer was 100.000. After the polymerisation 12 g of phenothiazine powder were added to the emulsion under stirring.

Various aqueous polymer solutions according to the examples above were tested for their heat stability. It could be proved that the stabilized aqueous polymer solution showed a viscosity between initial 1000 mPa s and 200 mPa s after 3 hours at 246° C. An unstabilized aqueous polymer solution showed a comparable stability only up to a temperature of 218° C.

The invention has been described above in connection with numerous examples and with reference to patents and published applications, the disclosures of which are incorporated herein by reference in their entirety. Further description is deemed unnecessary. Modification to the examples and description within the scope of the invention, set forth in the appended claims, will be readily apparent to one of skill in the art. Likewise, the various aspects and embodiments described above may be selected and/or combined in accordance with the present invention.

What is claimed is:

1. A stabilized aqueous polymer composition containing:
   A) a stabilizing amount of at least one phenothiazine compound present in an amount between 80 ppm and 5% by weight and
   B) at least one solvatable polysaccharide polymer with a weight average molecular weight of at least $10^4$ Daltons comprising groups which are capable of complex formation with ions.

2. A stabilized aqueous polymer composition containing:
   A) a stabilizing amount of between 80 ppm and 5% by weight of at least one phenothiazine compound: and
   B) at least one polymer with a weight average molecular weight of at least $10^4$ Daltons comprising groups which are capable of complex formation with ions, said polymer being selected from the group consisting of: (i) a galactomannan gum, (ii) a glucomannan gum and a cellulose derivative, (iii) a guar gum, (iv) a guar gum derivative, (v) a galactomannan gum, (vi) a glucomannan gum, and (vii) a xanthan gum.

3. A stabilized aqueous polymer composition containing:
   A) a stabilizing amount of between 80 ppm and 5% by weight of at least one phenothiazine compound and
   B) at least one polymer with a weight average molecular weight of at least $10^4$ Daltons comprising groups which are capable of complex formation with ions, each said polymer being selected from the group consisting of:
      (i) a galactomannan gum,
      (ii) a glucomannan gum and a cellulose derivative,
      (iii) a guar gum,
      (iv) a guar gum derivative chosen from the group consisting of:
         (a) hydroxyalkyl guar,
         (b) carboxyalkyl guar,
         (c) carboxyalkyl hydroxyalkyl guar, and
         (d) hydrophobically modified guar,
      (v) a galactomannan gum,
      (vi) a glucomannan gum, and
      (vii) a xanthan gum.

4. A stabilized aqueous polymer composition containing:
   A) a stabilizing amount of between 80 ppm and 5% by weight of at least one phenothiazine compound and
   B) at least one guar gum derivative with a weight average molecular weight of at least $10^4$ Daltons comprising groups which are capable of complex formation with ions, each said guar gum derivative being selected from the group consisting of:
      (a) hydroxyalkyl guar,
      (b) carboxyalkyl guar,
      (c) carboxyalkyl hydroxyalkyl guar, and
      (d) hydrophobically modified guar.

5. A stabilized aqueous polymer composition containing:
   A) a stabilizing amount of at least 10 ppm of at least one phenothiazine compound; and
   B) at least one synthetic polymer with a molecular weight of at least $10^4$ Daltons comprising groups which are capable of complex formation with ions; each said synthetic polymer being a copolymer derived by copolymerization of
      (a) least one amide of an ethylenically unsaturated carboxylic acid;
      (b) at least one ethylenically unsaturated phosphonic acid;
      (c) at least one ethylenically unsaturated sulfonic acid; and optionally
      (d) at least one ethylenically unsaturated carboxylic acid; and optionally
      (d) at least one additional copolymerizable monomer.

6. The stabilized aqueous polymer composition according to claim 5, wherein each said synthetic polymer is a copolymer derived from a combination of monomers selected from the group consisting of the following combinations of monomers:
   (A) at least one amide of an ethylenically unsaturated carboxylic acid, at least one ethylenically unsaturated phosphonic acid and at least one ethylenically unsaturated sulfonic acid;
   (B) at least one amide of an ethylenically unsaturated carboxylic acid, at least one ethylenically unsaturated phosphonic acid, at least one ethylenically unsaturated sulfonic acid and at least one ethylenically unsaturated carboxylic acid;
   (C) at least one amide of an ethylenically unsaturated carboxylic acid, at least one ethylenically unsaturated phosphonic acid, at least one ethylenically unsaturated sulfonic acid, and at least one N-vinylamide;
   (D) at least one amide of an ethylenically unsaturated carboxylic acid, at least one ethylenically unsaturated phosphonic acid, at least one ethylenically unsaturated sulfonic acid, at least one ethylenically unsaturated carboxylic acid, and at least one N-vinylamide.

7. The stabilized aqueous polymer composition according to claim 6, wherein each said synthetic polymer is a copolymer derived from the following combinations of monomers:
   (A) acrylamide and/or methacrylamide, and vinylphosphonic acid, and AMPS and/or vinylsulfonic acid;
   (B) acrylamide and/or methacrylamide, and vinylphosphonic acid, and AMPS and/or vinylsulfonic acid, and acrylic acid and/or methacrylic acid;

(C) acrylamide and/or methacrylamide, and vinylphosphonic acid, and AMPS and/or vinylsulfonic acid, and N-vinylformamide and/or N-vinylpyrrolidone;

(D) acrylamide and/or methacrylamide, and vinylphosphonic acid, and AMPS and/or vinylsulfonic acid, and acrylic acid and/or methacrylic acid, and N-vinylformamide and/or N-vinylpyrrolidone.

8. The stabilized aqueous polymer composition according to claim 7, wherein each said synthetic polymer is a copolymer derived from the following combination of monomers: acrylamide, vinylphosphonic acid, AMPS and optionally acrylic acid, methacrylic acid and a mixture of acrylic acid and methacrylic acid.

9. The stabilized aqueous polymer composition according to claim 8, wherein each said phenothiazine compound is selected from the group consisting of phenothiazine, alkyl-substituted phenothiazine, aryl-substituted phenothiazine, aroyl-substituted phenothiazine, carboxyl-substituted phenothiazine, halogen-substituted phenothiazine, N-(dialkylaminoalkyl)-substituted phenothiazine, phenothiazine-5-oxide, alkyl-substituted phenothiazine-5-oxide, aryl-substituted phenothiazine-5-oxide, aroyl-substituted phenothiazine-5-oxide, carboxyl-substituted phenothiazine-5-oxide, halogen-substituted phenothiazine-5-oxide, and N-(dialkylaminoalkyl)-substituted phenothiazine-5-oxide.

10. The stabilized aqueous polymer composition according to claim 5, wherein each said phenothiazine compound is selected from the group consisting of phenothiazine, 3-phenylphenothiazine, N-phenylphenothiazine, phenothiazine-5-oxide, 10,10'-diphenylphenothiazine, N-benzoylphenothiazine, 7-benzoylphenothiazine, 3,7-difluorophenothiazine, N-ethylphenothiazine, 2-acetylphenothiazine, 3,7-dioctylphenothiazine, N-methylphenothiazine-5-oxide, N-acetylphenothiazine, N-(2-diethylaminoethyl)-phenothiazine, N-(2-dimethylaminopropyl)-phenothiazine, N-(2-dimethylaminopropylphenothiazine)-hydrochloride, N-octadecylphenothiazine and N-propylphenothiazine.

11. The stabilized aqueous polymer composition according to claim 10, wherein each said synthetic polymer comprises groups which are capable of complex formation with ions selected from the group consisting of (i) borates and (ii) multivalent metals.

12. The stabilized aqueous polymer composition according to claim 10, wherein each said synthetic polymer comprises groups which are capable of complex formation with ions selected from the group consisting of (i) borates; (ii) zirconates; and (iii) titanates.

13. A gelled polymer obtained by crosslinking the aqueous polymer solution of claim 5 by the action of crosslinking ions.

14. A gelled polymer obtained by crosslinking an aqueous polymer solution obtained by diluting with water a water in oil polymer emulsion containing:
A) a stabilizing amount of at least 10 ppm of at least one phenothiazine compound, and
B) a polymer with a weight average molecular weight of at least $10^4$ Daltons comprising groups which are capable of complex formation with ions;
and by adding crosslinking ions to said aqueous polymer solution.

15. A solid formulation containing:
A) a stabilizing amount of at least 10 ppm of at least one phenothiazine compound, and
B) a polymer with a weight average molecular weight of at least $10^4$ Daltons comprising groups which are capable of complex formation with ions
in particulate solid form.

16. The solid formulation of claim 15 wherein at least one phenothiazine compound is present in an amount of between at least 10 ppm and 5%.

17. The solid formulation of claim 16 wherein said polymer has a weight average molecular weight of at least $10^5$ Daltons.

18. The solid formulation of claim 16 wherein said polymer has a weight average molecular weight of at least $10^5$ Daltons.

19. A stabilized aqueous polymer composition containing:
A) a stabilizing amount of at least 10 ppm of at least one phenothiazine compound and
B) at least one polymer with a weight average molecular weight of at least $10^4$ Daltons comprising groups which are capable of complex formation with ions.

20. The stabilized aqueous polymer composition according to claim 19, wherein the at least one phenothiazine compound is present in an amount between 10 ppm and 5% by weight.

21. The stabilized aqueous polymer composition according to claim 20, wherein said at least one polymer has a weight average molecular weight of at least $10^5$ Daltons.

22. The stabilized aqueous polymer composition according to claim 20, wherein said at least one polymer has a weight average molecular weight of at least $10^5$ Daltons.

23. The stabilized aqueous polymer composition according to claim 20, wherein said polymer is a solvatable polysaccharide or a synthetic polymer with functional groups that can be crosslinked via ions.

24. The stabilized aqueous polymer composition according to claim 20, wherein said polymer is a synthetic polymer.

25. The stabilized aqueous polymer composition according to claim 20, wherein said phenothiazine compound is selected from the group consisting of phenothiazine, 3-phenylphenothiazine, N-phenylphenothiazine, phenothiazine-5-oxide, 10,10'-diphenylphenothiazine, N-benzoylphenothiazine, 7-benzoylphenothiazine, 3,7-difluorophenothiazine, N-ethylphenothiazine, 2-acetylphenothiazine, 3,7-dioctylphenothiazine, N-methylphenothiazine-5-oxide, N-acetylphenothiazine, N-(2-diethylaminoethyl)-phenothiazine, N-(2-dimethylaminopropyl)-phenothiazine, N-(2-dimethylaminopropylphenothiazine)-hydrochloride, N-octadecylpheno-thiazine and N-propylphenothiazine.

26. A water in oil polymer emulsion containing:
A) a stabilizing amount of at least 10 ppm of at least one phenothiazine compound, and
B) a polymer with a weight average molecular weight of at least $10^4$ Daltons comprising groups which are capable of complex formation with ions.

27. The water in oil polymer emulsion according to claim 26, wherein the at least one phenothiazine compound is present in an amount between 10 ppm and 5% by weight.

28. The water in oil polymer emulsion according to claim 27, wherein said at least one polymer has a weight average molecular weight of at least $10^5$ Daltons.

29. The water in oil polymer emulsion according to claim 26, wherein said at least one polymer has a weight average molecular weight of at least $10^5$ Daltons.

30. A dispersion containing a non-aqueous fluid having suspended or dispersed therein
A) a stabilizing amount of at least 10 ppm of at least one phenothiazine compound, and
B) a polymer with a weight average molecular weight of at least $10^4$ Daltons comprising groups which are capable of complex formation with ions.

31. The dispersion containing a non-aqueous fluid according to claim 30, wherein said at least one polymer has a weight average molecular weight of at least $10^5$ Daltons.

32. The dispersion containing a non-aqueous fluid according to claim 31, wherein the at least one phenothiazine compound is present in an amount between 10 ppm and 5% by weight.

33. The dispersion containing a non-aqueous fluid according to claim 30, wherein the at least one phenothiazine compound is present in an amount between 10 ppm and 5% by weight.

34. A method of stabilizing a polymer admixture chosen from the group consisting of aqueous polymer solutions and water in oil polymer emulsions, said admixture containing a polymer containing groups which are capable of complex formation with ions, said polymer having a weight average molecular weight of at least $10^4$ Dalton which method comprises adding a stabilizing amount of at least 10 ppm of at least one phenothiazine compound to said aqueous polymer solution or to said water in oil polymer emulsion to result in a stabilization against thermal degradation of said polymer.

35. The method of stabilizing a polymer admixture according to claim 34, wherein the at least one phenothiazine compound is present in an amount between 10 ppm and 5% by weight.

36. The method of stabilizing a polymer admixture according to claim 35, wherein said at least one polymer has a weight average molecular weight of at least $10^5$ Daltons.

37. The method of stabilizing a polymer admixture according to claim 34, wherein said at least one polymer has a weight average molecular weight of at least $10^5$ Daltons.

* * * * *